United States Patent Office 3,431,240
Patented Mar. 4, 1969

3,431,240
ANHYDRIDE-CONTAINING LINEAR
POLYARYLSULFONES
Herward A. Vogel, Oakdale Township, Washington
County, and Hans T. Oien, St. Paul, Minn., assignors to Minnesota Mining and Manufacturing
Company, St. Paul, Minn., a corporation of
Delaware
No Drawing. Filed Apr. 8, 1966, Ser. No. 541,124
U.S. Cl. 260—49                                    14 Claims
Int. Cl. C08g 25/00, 23/00

ABSTRACT OF THE DISCLOSURE

Thermoplastic substantially linear polyarylsulfones having carboxy anhydride groups on the main chains thereof. These include polymers having recurring anhydride groups along the chains thereof as well as those having terminal anhydride groups. Also disclosed is a new class of compounds which are precursors of disclosed polymers. These compounds have the formula:

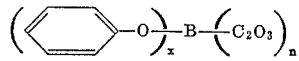

wherein $x$ and $n$ are 1-2, B is an organic group containing 6–13 carbon atoms and $C_2O_3$ is a carboxylic anhydride group.

Detailed description

This invention relates to novel polyarylsulfone copolymers, to a process for their preparation and to certain novel anhydrides which can be used in the preparation of the linear polymers.

Although arylsulfone polymers have been known heretofore (e.g. see Belgian Patent 639,634), their use had been restricted because of the great chemical inertness and high stability of these polymers toward other reagents. The present invention provides linear arylsulfone polymers having reactive sites on the main chains thereof.

More particularly, the invention relates to thermoplastic linear, soluble polyarylsulfones having carboxyanhydride groups in the main chains thereof, to a process for their preparation and to a novel class of carboxyanhydride compounds which are useful in the preparation of the linear polymers. The linear polymers, which can be designated as polyarylsulfone-carboxyanhydride copolymers (or PArS-anhydrides for convenience) can be either anhydride terminated, can contain repeating anhydride groups along their main chains or both. The anhydride groups are present in precursors of the polymers and, as shown by infrared spectra, are retained in the polymers themselves.

The polymers preferably contain no aliphatic carbon-carbon bonds in their main chains. They are generally of high molecular weight having inherent viscosities of not less than about 0.2, although this is not necessarily so. They are ordinarily strong and form relatively tough, flexible, orientable films and filaments of good physical properties and have low weight loss when heated to high temperatures.

It is an object of this invention to provide novel condensation copolymers which possess aromatic sulfone and carboxyanhydride groups on the main chains thereof.

It is another object of this invention to provide linear polyarylsulfone copolymers having recurring carboxyanhydride groups along the main chains thereof.

It is a further object of the invention to provide linear polyarylsulfone-anhydride copolymers having carboxyanhydride groups at the ends of the chains thereof.

It is a further object of the invention to provide a process for the preparation of the novel linear polyarylsulfone-carboxyanhydride copolymers.

It is still a further object of the invention to provide a novel class of carboxyanhydride compounds useful in the preparation of the polymers of the invention.

Further objects of the invention will become apparent to those skilled in the art from reading this specification.

The linear PArS-anhydrides are prepared by heating together in the presence of a catalytic amount of an anhydrous Lewis acid at least one compound of the formula:

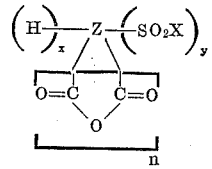

wherein (H) is a sulfonatable hydrogen atom ($SO_2X$) is a reactive sulfonyl halide group, $n$ is 1–2 and $x$ and $y$ are each 0–2, the sum of $x$ and $y$ being 1–2. Z is a primarily aromatic organic group ordinarily containing no aliphatic carbon chains but which may contain hetero atoms such as —O— and —S— or —$CH_2$— groups between aromatic rings. The sum of $x$ and $y$ in any chain extending compound (monomer) is 2 and the sum of $x$ and $y$ in any chain terminating compound is 1. Although it is possible with the use of only a compound of the above formula in which both $x$ and $y$ are 1 to form a linear polymer of the invention, normally the reaction mixture in the preparation of the PArS-anhydrides also contains at least one compound of the formula:

$$(H)_xR(SO_2X)_y$$

wherein (H), $x$, $y$ and ($SO_2X$) are as previously defined and R is an aromatic structure. In these precursor compounds (H) and/or ($SO_2X$) are bonded to Z and R through aromatic rings therein which are free of hetero nitrogen atoms.

Ordinarily each Z contains not more than about 30 carbon atoms (preferably not more than about 20 carbon atoms) and the carbonyl carbons of the anhydride groups thereon are bonded directly to aromatic ring carbon atoms. In a preferred class the carbonyl carbons of each anhydride group are bonded to carbon atoms that are ortho to one another in the same aromatic ring. R ordinarily contains not more than about 20 carbon atoms and is preferably entirely aromatic. In the linear copolymers in which Z and R recur along the chain, they need not appear in any particular order.

The linear polymers are formed by dehydrohalogenative condensation reactions between the (H) and ($SO_2X$) groups. The total valence of R in any precursor compound is equal to the sum of $x$ and $y$ for that compound and the total valence of Z is $x+y+2n$. The ($SO_2X$) groups are sulfonyl chloride or sulfonyl bromide, preferably sulfonyl chloride.

The underlying principle for the wide choice of operable monomers for the process appears to be the deactivating effect of the sulfonyl group on the aromatic ring to which it is or becomes attached. This deactivation is sufficient to prevent any significant amount of higher than monosulfone formation in any one ring.

Branching and crosslinking are thus suppressed. The amounts of the difunctional chain extending monomers of the types:

(1) (H)₂R
(2) (H)₁R(SO₂X)₁
(3) R(SO₂X)₂
(4) (H)₂Z
    |
    (C₂O₃)ₙ
(5) (H)₁Z(SO₂X)₁
    |
    (C₂O₃)ₙ and (6) Z(SO₂X)₂
    |
    (C₂O₃)ₙ charged must be such as to balance stoichiometrically the (H) and (SO₂X) groups present in order to obtain relatively long chain monomers.

The monofunctional compounds:

(7) (H)R
(8) R(SO₂X)
(9) (H)Z
    |
    (C₂O₃)ₙ and

(10) Z(SO₂X)
     |
     (C₂O₃)ₙ act as chain terminators.

Thus, by maintaining close stoichiometry of sulfonyl halide groups and overall hydrocarbon content, i.e., phenyl rings available for sulfonation, high molecular weight linear polymers are obtained. This is unobvious since it would ordinarily be expected that the carboxyanhydride moiety would interfere in the Friedel-Crafts catalyzed condensation of sulfonyl chloride and aromatic hydrocarbon by itself reacting with the Lewis acid (Friedel-Crafts) catalyst and the available hydrocarbon to form keto acid structures, thus preventing build-up of high molecular weight sulfone polymer. Phthalic anhydride, for example, is known to react with aromatic hydrocarbons in the presence of Lewis acid catalysts to form benzophenone carboxylic acid derivatives. Refr. Friedel-Crafts, Comptes rendus, 86, 1370.

The reason for the inert behavior of the carboxy anhydride groups during the sulfone polymerization is believed to be in the reaction conditions (e.g., higher temperatures are required for the activation of the carboxy anhydride groups) and the choice of catalyst (listed elsewhere herein).

The forgoing classes of compounds (1) through (10) can be exemplified as follows:

(1) Biphenyl, naphthalene, anthracene, diphenylmethane, diphenyl ether, diphenyl sulfide and the like; as well as compounds of the formula:

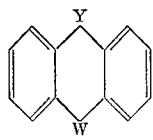

wherein Y is a member of the group consisting of —O—, —S— and a carbon-carbon valence bond and W is a member of the group consisting of —O—, —S— and —CH₂—. Moieties exemplified by the latter formula include dibenzofuran, fluorene, xanthene, dibenzothiophene, dibenzo-4-thioxane, and the like.

(2) p-Diphenylether monosulfonyl chloride, naphthylphenylether monosulfonyl chloride, p-biphenyl monosulfonyl chloride, 2-fluorene sulfonyl chloride, 2-dibenzofuran sulfonyl chloride and 2-naphthalene sulfonyl chloride.

(3) p,p'-Diphenyl ether disulfonyl chloride, p,p'-diphenyl methane disulfonyl chloride, p,p'-biphenyl disulfonyl chloride, 2,7-fluorene disulfonyl chloride, 2,8-dibenzofuran disulfonyl chloride, 2,7-naphthalene disulfonyl chloride and p,p'-diphenylsulfide disulfonyl chloride.

(4) 4,5-Diphenoxy phthalic anhydride, 4,5-diphenoxy naphthalic anhydride, 3,6-diphenoxy pyromellitic dianhydride.

(5) 5-Phenoxy - 4 - chlorosulfonyl-phthalic anhydride (prepared by condensation of 5-chlorophthalic-anhydride sulfonic acid with potassium phenolate and chlorination of the sulfonic acid group to the sulfonyl chloride).

(6) 4,5 - (p,p' - Dichlorosulfonyl) diphenoxyphthalic anhydride (prepared by chlorosulfonation of 4,5-diphenoxy phthalic anhydride).

(7) Benzene, toluene, xylene.

(8) Benzene sulfonyl chloride and toluene sulfonyl chloride.

(9) 4-Phenoxy phthalic anhydride, 4'-phenoxy benzophenone 3,4-dicarboxy anhydride.

(10) 4-Chlorosulfonyl phthalic anhydride, 4'-chlorosulfonyl-3,4-carboxyhydride diphenyl ether. Also useful is trimellitic anhydride acid chloride.

Any of the above compounds can be further substituted with small non-reactive substituents on the aromatic nuclei. Thus, the aromatic nuclei may additionally bear alkyl or perfluoroalkyl groups, such as methyl, ethyl, propyl, hexyl and the like; lower alkoxy groups, such as methoxy, ethoxy, butoxy, etc.; halogen atoms, such as chlorine or bromine, or other similar small substituents which are inert under the conditions of the polycondensation reaction. Those compounds which carry such substituents preferably carry them in the meta position to the reactive functions (H) and (SO₂X). The most preferred groups, however, contain no substituents.

The preparation of the linear polymers, broadly speaking, is carried out in either a melt or a solution and ordinarily at a temperature ranging from 100 to 200° C. in the presence of a condensation catalyst.

It is generally preferred to utilize an inert solvent in carrying out the polymerization process in order to increase the fluidity of the reaction mixture. The preferred solvents are chlorinated aliphatic and aromatic hydrocarbons, e.g. s-tetrachloroethane, methylene chloride, and Arochlors (highly chlorinated biphenyl and diphenyl ether), etc. or aliphatic and aromatic sulfones such as dimethyl sulfone, tetramethylene sulfone, p,p'-dichlorodiphenylsulfone, etc., or aliphatic and aromatic nitro compounds, such as n-nitropropane, nitrobenzene, 2,3-dichloronitrobenzene, etc. The particularly preferred solvents are nitrobenzene and the chloronitrobenzenes.

To effect the polycondensation the monomers or comonomers are generally first heated in the presence of an insert solvent to a temperature sufficient to obtain a uniform reaction mixture after which the catalyst is added. The mixture is then maintained at a temperature in the range of from 100 to 200° C. for from about one to twenty hours, to complete the polymerization. High molecular weight PArS-anhydrides are produced in good yields in this manner as is shown by the examples herein.

Effective condensation catalysts are anhydrous Lewis acids (also known as Friedel-Crafts catalysts) such as ferric chloride, antimony pentachloride, molybdenum pentachloride, indium trichloride, gallium trichloride, etc. Anhydrous hydrofluoric acid, or trifluoromethane sulfonic acid also may be used as catalysts. The particularly preferred catalysts are the halides of iron and indium.

The catalysts are generally found to be effective in amount of from 0.05 to about 0.5 mole percent, based on the amount of monomer present. Greater proportions of catalyst may be utilized but this is generally unnecessary and is ordinarily avoided, because larger amounts can adversely affect the degree of polymerization and the separation of the catalyst from the polymer may prove difficult.

Linear PArS-anhydrides prepared using anhydride-containing precursors in which $x+y$ is 2 have recurring aromatic sulfone-anhydride units in the main chain of formula:

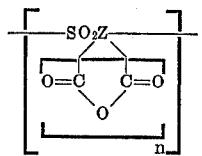

and those prepared using the precursors in which $x+y$ is 1 have terminal aromatic sulfone-anhydride units of the formula:

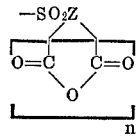

The sulfone groups therein are provided by the precursor itself in compounds in which $y$ is 1 or 2 and by the next adjacent precursor in the polymer chain in compounds in which $y$ is 0. The foregoing recurring and terminal units can also be written as

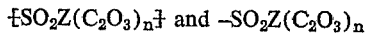

The molar ratios of the anhydride ($C_2O_3$) to sulfone ($SO_2$) groups in the PArS-anhydrides generally range from about .005 to 1. The anhydride group ordinarily has little effect at concentrations below this range, while the molar ratio of 1 to 1 represents a practical maximum. Preferably, the molar ratio of the anhydride to sulfone groups in the PArS-anhydrides is from about 1 to 20 percent. Those containing recurring anhydride groups preferably have molar ratios (of the anhydride to sulfone groups) from about 1 to 20 percent while in those having only terminal anhydrides the molar ratio thereof is preferably from about 1 to 10 percent. Normally, the linear polymers contain not more than about 30 percent nor less than about 10 percent by weight of sulfone groups. Often the linear polymers of the invention contain only carbon, hydrogen and oxygen (except for the sulfone groups) and all of the rings therein are carbocycles.

A particularly preferred class of anhydride-containing precursors of the general type $(H)_xZ(C_2O_3)_n$ are novel and form another aspect of the invention. They have the formula:

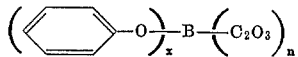

wherein $x$ and $n$ are as previously defined and B is an aromatic group containing from about 6 to 13 carbon atoms. Ordinarily in this group (although not invariably) B is wholly aromatic and contains only carbon and hydrogen. Most preferably in these compounds $n$ is 1. The hydrogen atom, (H), in each phenoxyl group of these compounds which is preferred for sulfonation is in the para position with respect to the oxygen. These compounds can generally be prepared by the condensation reaction of a halogenated (e.g. bromine or chlorine) aromatic hydrocarbon which contains the desired aromatic structure (B) with potassium phenolate to form the phenoxy groups on the aromatic nucleus, oxidizing the resulting compound with potassium permanganate in a hot pyridine/water solution to form the di- or tetracarboxylic acid intermediate then dehydrating (e.g. with acetic anhydride) to form the desired mono- or di-carboxylic anhydride compound. In some cases the anhydride compounds can be prepared by Friedel-Crafts condensation of an aromatic compound with an aromatic acid chloride.

A preferred class of the linear polymers of the invention are prepared using these anhydride-containing precursors of the invention in which $x$ is 2 and have recurring units of the formula:

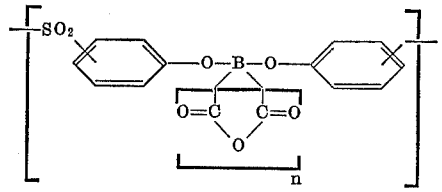

In these linear polymers there may be other structure intervening between such units (e.g. resulting from the precursor compound $(H)_xR(SO_2X)_y$). In some cases these polymers have repeating units of the formula:

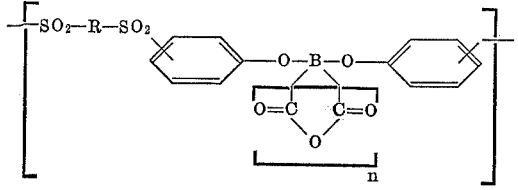

A second preferred class of linear polymers of the invention are prepared using the anhydride-containing precursors of the invention in which $x$ is 1 and we have terminal units of the formula:

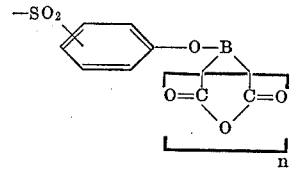

The linear PArS-anhydrides can be further reacted through their anhydride groups in various ways to form highly useful materials. Functional groups suitable for reaction with the anhydrides often (but not always) contain active hydrogen. Amine and hydroxy groups are useful as are epoxy groups and certain metal salts which form coordination bonds with the anhydrides.

The PArS-anhydrides with recurring anhydride groups can be (a) cross-linked with di- or poly-functional materials,
(b) made into graft copolymers (the linear copolymers of the invention normally appearing as the main chain thereof), and
(c) reacted with a difunctional compound in such a way that one function thereof reacts with the recurring anhydride groups and the other function remains available for further reaction.

The PArS-anhydrides having only terminal anhydride groups can be (d) chain extended, and
(e) crosslinked through such groups.

Other useful reactions of the linear polymers of the invention are also possible. Thus they can be hydrolyzed to the dicarboxylic acid derivatives and as such they are easily dyeable due to the anhydride groups. In addition, isocyanates can be added to the dicarboxylic derivatives and the products heat foamed by evolution of carbon dioxide and formation of amide links.

The linear polymers can be mixed with co-reactants from melt or from solution. The uncured polymers have melt temperatures ranging from about 200° to above about 400° C. and can withstand temperatures of 400° C. without degrading. Varying degrees of solubility are exhibited by the different polymers, depending on the structure of the particular polyarylsulfone backbone, but all are soluble in concentrations up to ten percent in phenol at 175° C. Most of the polymers are also soluble in such solvents as N-methyl-pyrrolidinone, N,N'-dimethylformamide, dimethylsulfoxide, pyridine, methylene chloride, etc., which are well suited for the casting of films and the spinning of fibers.

The polymers of the invention can also be filled using particulate or fibrous fillers or they can be used with glass fibers to form laminate structures. The crosslinked polymers reinforced with glass fibers provide particularly strong, durable structures at high temperatures and have uses, for example, in such applications as ablative reentry nose cones, etc.

The following examples are intended to illustrate the present invention, but no limitations to the scope of the invention are implied thereby. All parts are by weight, unless otherwise specified. Inherent viscosities of the polymers are determined by dividing the flow time in a capillary viscometer of a dilute solution (1.0 gram of polymer per 100 ml. of solution) of the polymer by the flow time for the pure solvent. The measurements are made at a temperature of 25° C. in dimethylformamide solution, unless otherwise noted.

THE ANHYDRIDE PRECURSORS

Example 1

The anhydrides of which the preparation is described in this example are summarized in the following table:

in hot pyridine/water solution and dehydration of the 4,5-diphenoxy naphthalic acid with acetic anhydride.

3,6-diphenoxy pyromellitic dianhydride is prepared by melt reaction of 3,6-dibromodurene with potassium phenolate and copper catalyst, oxidation of the resulting diphenoxy durene with potassium permanganate in hot pyridine/water solution and dehydration of the tetracarboxylic acid with acetic anhydride.

4-phenoxy phthalic anhydride is prepared by melt reaction of 4-bromo-o-xylene with potassium phenolate and copper catalyst, oxidation of the resulting 4-phenoxy-o-xylene with potassium permanganate in hot pyridine/water solution, and dehydration of the dicarboxylic acid with acetic anhydride.

4-phenoxy benzophenone-3',4'-dicarboxy anhydride is prepared from diphenyl ether by Friedel-Crafts condensation with trimellitic anhydride acid chloride.

THE LINEAR POLYMERS CONTAINING RECURRING ANHYDRIDE GROUPS

Example 2

Preparation of a linear polymer from diphenyl ether, diphenyl ether 4,4'-disulfonylchloride and 4,5-diphenoxy phthalic anhydride.

| Name | Structural Formula | Color | Melting Point, °C. |
|---|---|---|---|
| 4,5-diphenoxy phthalic anhydride | [structure] | White | 154–155 |
| 4,5-diphenoxy naphthalic anhydride | [structure] | Yellow | 244–245 |
| 3,6-diphenoxy pyromellitic dianhydride | [structure] | Yellow-orange | 338–339 |
| 4-phenoxy phthalic anhydride | [structure] | White | 114–115 |
| 4-phenoxy benzophenone 3',4'-dicarboxy anhydride | [structure] | Yellow | 154–155 |

4,5-diphenoxy phthalic anhydride is prepared by melt reaction of 4,5-dibromo-o-xylene with potassium phenolate and copper catalyst, oxidation of the resulting diphenoxy xylene with potassium permanganate in hot pyridine/water solution and dehydration of the dicarboxylic acid with acetic anhydride.

4,5-diphenoxy naphthalic anhydride is prepared by melt reaction of 5,6-dichloroacenaphthene with potassium phenolate and copper catalyst, oxidation of the resulting diphenoxy acenaphthene with potassium permanganate A mixture of 110.17 g. of phenyl ether disulfonylchloride, 45.96 g. of phenyl ether, 9.97 g. (5 mole percent) of 4,5-diphenoxy phthalic anhydride and 140 g. of nitrobenzene is placed in a 500 ml. 3-neck flask fiitted with a mechanical stirrer and nitrogen-gas inlet and outlet.

The mixture is heated to 95° C. and 300 mg. of anhydrous ferric chloride catalyst is added to the stirred solution to initiate the polymerization. The temperature is raised to 123° within ½ hour and slow stirring of the reaction mixture under bleeding nitrogen is continued at this temperature for 30 hours. The viscous mass is diluted with 280 g. of dry dimethylacetamide to give a polymer solution of about 25% solids content. A small portion of this solution is precipitated in methanol and the recovered polymer extracted with a hot methanol/acetone mixture and dried. The inherent viscosity of the linear polymer is 0.58.

Example 3

Preparation of four linear polymers from biphenyl, biphenyl-monosulfonyl chloride, diphenyl ether 4,4'-disulfonyl chloride and 4,5-diphenoxy phthalic anhydride.

In each case the phenyl ether disulfonyl chloride, biphenyl, biphenylmonosulfonyl chloride, 4,5-diphenoxy phthalic anhydride and 135 g. of nitrobenzene are charged to a 500 ml. three-necked flask. The flask is purged with a slow stream of nitrogen and heated to 110° C. To the stirred solution is added 1.0 g. of an anhydrous indium trichloride catalyst. The evolution of hydrogen chloride becomes vigorous within 5 minutes and the gas is carried by the nitrogen to a water trap. The temperature is increased to 130° within 1 hour and then maintained at 130° for 24 hours. A small sample is then taken from the reaction mixture for measurement of the inherent viscosity of the polymer. The charge and inherent viscosity in each case are summarized in the following table:

| Lot | Phenyl ether disulfonyl chloride (g.) | Biphenyl (g.) | Biphenyl-monosulfonyl chloride (g.) | 4,5-diphenoxy phthalic anhydride (g.) | Inherent Viscosity |
|---|---|---|---|---|---|
| A | 74.55 | 28.07 | 50.55 | 5.98 (3 mole percent) | 0.34 |
| B | 74.55 | 26.22 | 50.55 | 9.97 (5 mole percent) | 0.48 |
| C | 73.45 | 24.37 | 50.55 | 13.96 (7 mole percent) | 0.35 |
| D | 73.45 | 21.59 | 50.55 | 19.94 (10 mole percent) | 0.37 |

Example 4

Preparation of a linear polymer from biphenyl, diphenyl ether 4,4'-disulfonyl chloride and 4,5-diphenoxy phthalic anhydride.

A mixture of 73.81 g. of phenyl ether disulfonylchloride, 15.42 g. of biphenyl, 33.23 g. (25 mole percent) of 4,5-diphenoxy phthalic anhydride and 107 g. of nitrobenzene is polymerized with 800 mg. of indium trichloride under the same conditions as described in Example 3. The final polymer shows an inherent viscosity of 0.33.

Example 5

Preparation of a linear polymer from biphenyl, biphenyl-monosulfonyl chloride, diphenyl ether 4,4'-disulfonyl chloride and 3,6-diphenoxy pyromellitic dianhydride.

A mixture of 36.72 g. of phenyl ether disulfonylchloride, 14.04 g. of biphenyl, 25.27 g. of biphenylmonosulfonylchloride, 1.81 g. (1.5 mole percent) of 3,6-diphenoxy pyromellitic dianhydride and 68 g. of nitrobenzene is polymerized with 500 mg. indium trichloride catalyst as described in Example 3. The linear polymer shows an inherent viscosity of 0.26.

Example 6

Preparation of a linear polymer from biphenyl, biphenyl-monosulfonyl chloride, diphenyl ether 4,4'-disulfonyl chloride and 4,5-diphenoxy naphthalic anhydride.

A linear polymer similar to that of the preceding example is obtained when 4,5-diphenoxy naphthalic anhydride is utilized in place of the 3,6-diphenoxy pyromellitic dianhydride.

THE LINEAR POLYMERS CONTAINING TERMINAL ANHYDRIDE GROUPS

Example 7

Preparation of a linear polymer from biphenyl, biphenyl-monosulfonyl chloride, diphenyl ether 4,4'-disulfonyl chloride and 4-phenoxy phthalic anhydride.

A mixture of 74.17 g. of phenyl ether disulfonyl chloride, 50.55 g. of biphenylmonosulfonylchloride, 30.23 g. of biphenyl, and 180 g. of nitrobenzene is polymerized with 750 mg. indium trichloride catalyst as described in Example 2. After the polymerization has proceeded at 130° for 4½ hours, 2.88 g. (2 mole percent) of 4-phenoxy phthalic anhydride dissolved in 20 g. of nitrobenzene is added to the reaction mixture and heating is continued for another 20 hours. The resulting linear polymer is anhydride-terminated but contains no anhydride groups at intermediate positions along the chain.

Example 8

Preparation of linear polymer from biphenyl, biphenylmonosulfonyl chloride, diphenyl ether 4,4'-disulfonyl chloride and 4-phenoxy benzophenone-3',4'-dicarboxy anhydrides.

A mixture of 76.21 g. of phenyl ether disulfonylchloride, 50.55 g. of biphenylmonosulfonyl chloride, 30.84 g. of biphenyl in 115 g. of nitrobenzene solvent is polymerized with 1 g. of indium trichloride as described in Example 2. After the polymerization has proceeded for 4½ hours, 5.165 g. of 4-phenoxy benzophenone 3',4'-dicarboxy anhydride dissolved in 20 g. of nitrobenzene is added to the reaction mixture and heating is continued for another 20 hours. The inherent viscosity of the final polymer is 0.24. The resulting linear polymer is anhydride-terminated but contains no anhydride groups at intermediate positions along the chain.

Example 9

Preparation of a linear polymer from diphenyl ether, diphenyl ether 4,4'-disulfonyl chloride and trimellitic anhydride acid chloride.

A mixture of 74.18 g. of phenyl ether disulfonyl chloride, 35.40 g. of diphenyl ether in 90 g. of nitrobenzene solution is polymerized with 200 mg. of ferric chloride catalyst as described in Example 1. After 10 hours reaction time at 120° C. a solution of 4.21 g. of trimellitic anhydride acid chloride in 10 g. of nitrobenzene is added together with an additional 100 mg. of ferric chloride catalyst. The reaction is continued at 120° C. for another 24 hours. The resulting linear polymer is anhydride-terminated but contains no anhydride groups at intermediate positions along the chain.

Example 10

Preparation of a linear polymer from diphenyl ether, diphenyl ether 4,4'-disulfonyl chloride and 4-phenoxy phthalic anhydride.

A PArS-anhydride polymer is prepared from 77.12 g. of diphenyl ether disulfonyl chloride, 34.04 g. of phenyl ether, 3.84 g. (4 mole percent) 4-phenoxyphthalic anhydride, and 700 mg. of indium trichloride catalyst in 100 g. of nitrobenzene at 120° C. using essentially the procedure of Example 8 hereof. The 4-phenoxyphthalic anhydride is added 2 hours after the start of the polymerization. The reaction is then continued for 20 hours at 120° C. At the end, the polymerization mixture is degassed by application of vacuum and diluted with 200 g. of dimethylacetamide to give a 25% solids solution.

POLYMER EVALUATION

Example 11

Crosslinking of the linear polymers of Examples 2-4 as measured by the cut-through temperature test.

The cut-through temperature test is used as a measure of the softening temperature of the polymers. Comparative data give good indications of the effectiveness of curing reactions and the relative density of crosslinked networks. The measurements are carried out on a film of the polymer held between two crossed No. 18 gauge wires or using two crossed No. 18 gauge wires coated with the polymer. In either case the wires are pressed together with a force of 2 kg. and the temperature is raised at the rate of about 1° C. per minute. The thickness of the polymer is not highly critical but can be about 0.01 inch. The endpoint is reached when the wires touch and is determined when electrical contact is made between them.

Films of the linear polymers of Examples 2-4 with and without crosslinkers are solvent cast (using dimethylacetamide or nitrobenzene as the solvent), the solvent is evaporated and the films are then cured for 15-30 minutes at 260° C. and for 15-30 minutes at 316° C. (unless otherwise specifically noted). The cut-through temperatures of the resulting films are measured. The results are as follows:

| Example | Mole Percent of Carboxy Anhydride Monomer | Crosslinker | Cut-through Temp., °C. | |
|---|---|---|---|---|
| | | | Without Crosslinker | With Crosslinker |
| 2 | 5 | Diacetyl oxydianiline | 250 | 290 |
| 3A [1] | 3 | p-Amino acetanilide | 320 | 350 |
| 3B | 5 | do | 330 | 370 |
| 3C | 7 | do | 330 | 380 |
| 3D | 10 | do | 330 | 390 |
| 4 | 25 | do | 320 | >400 |

[1] Cured 45 minutes at 316° C.

Thus, the mole percent of the anhydride-containing monomer in the polymer has an important effect on the increase in cut-through temperature brought about by the crosslinking.

Example 12

Chain extension of the linear polymers of Examples 7-9.

The polymer solution of Example 7 is then degassed by application of vacuum and diluted with 200 g. of dimethylformamide. The solution is treated with 0.9 g. of p-aminoacetanilide, stirred for 30 minutes and precipitated in methanol. The recovered polymer is extracted with a hot acetone/methanol mixture and dried. The polymer shows an inherent viscosity of 0.25. A sample of this polymer is then heated at 600° F. for 45 minutes to effect the chain extension reaction. The inherent viscosity of the material increases to 0.45. Films cast of the original material are relatively weak and brittle, whereas the cured polymer gives tough and flexible films.

The polymer mixture of Example 8 is degassed by application of an aspirator vacuum and diluted with 200 g. of dimethylacetamide and allowed to cool to room temperature. Then 1.152 g. of oxydianiline dissolved in 20 ml. of dimethylacetamide is added and the mixture stirred for 45 minutes. The solution is used to prepare films which are cast on aluminum foil, dried at 150° to 400° F. with a temperature rise of 50° per 30 minutes and finally cured at 600° F. for 45 minutes. A tough flexible film is obtained with an inherent viscosity of 0.38.

The polymer solution of Example 9 is allowed to cool to 80°, degassed by application of an aspirator vacuum and then diluted with 100 g. of dimethyl acetamide to give a 33.3% solids solution. A small portion of this solution is poured into methanol and the precipitated polymer extracted with hot methanol and dried. The polymer shows an inherent viscosity of 0.28.

To 30 g. of the above polymer solution is added a solution of 0.20 g. of oxydianiline in 10 g. of dimethylacetamide. After ½ hour stirring at room tempreature, the polymer shows an inherent viscosity of 0.47. Tough and flexible films can be cast from the solution of the oxydianiline-chain extended polymer, whereas the solution of the untreated original polymer gives a comparatively weak and brittle film.

What is claimed is:

1. Thermoplastic, substantially linear, polyarylsulfones having carboxy anhydride groups on the main chains thereof which are soluble in concentrations up to 10 percent in phenol at 175° C., the molar ratios of the anhydride to sulfone groups thereon ranging from .005 to 1.

2. Thermoplastic, substantially linear, polyarylsulfones having recurring aromatic carboxy anhydride groups along the main chains thereof, the polymers being soluble in concentrations up to 10 percent in phenol at 175° C. and the molar ratios of the anhydride to the sulfone groups therein ranging from about .005 to 1.

3. Polymers according to claim 2 having recurring aromatic sulfone-anhydride units in the main chains thereof of the formula:

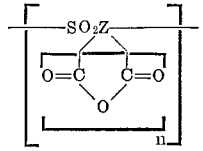

wherein Z is an aromatic organic group having its main chain valences on aromatic rings therein which are free of hetero nitrogen, said Z containing not more than about 30 carbon atoms and $n$ is 1-2.

4. Thermoplastic, substantially linear, polyarylsulfones having recurring units of the formula:

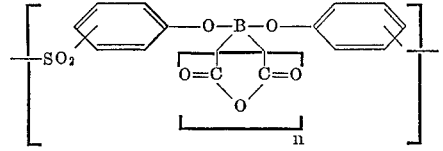

wherein B is an aromatic group containing only carbon and hydrogen and having from about 6 to 13 carbon atoms and $n$ is 1-2, the polymers being soluble in concentrations up to 10 percent in phenol at 175° C. and the molar ratios of the anhydride to the sulfone groups therein ranging from about .005 to 1.

5. A linear polymer according to claim 4 wherein $n$ is 1.

6. A linear polymer according to claim 4 wherein B is a benzene ring.

7. A linear polymer according to claim 5 wherein B is a benzene ring.

8. Thermoplastic, substantially linear, polyarylsulfones having repeating units of the formula:

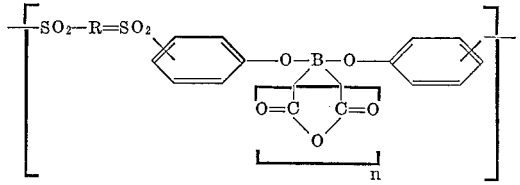

wherein R is an aromatic group containing not more than about 20 carbon atoms, B is an aromatic group containing only carbon and hydrogen and having from about 6 to 13 carbon atoms and $n$ is 1–2, the polymers being soluble in concentrations up to 10 percent in phenol at 175° C. and the molar ratios of the anhydride to the sulfone groups therein ranging from about .005 to 1.

9. Thermoplastic, substantially linear, polyarylsulfones having carboxy anhydride terminated main chains, the polymers being soluble in concentrations up to 10 percent in phenol at 175° C. and the molar ratios of the anhydride to sulfone groups therein ranging from about .005 to 1.

10. Polymers according to claim 9 having terminal aromatic sulfone-anhydride units in the main chains thereof of the formula:

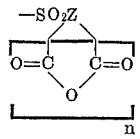

wherein Z is an aromatic organic group having its main chain valence on an aromatic ring therein which is free of hetero nitrogen, said Z containing not more than about 30 carbon atoms and $n$ is 1–2.

11. Thermoplastic, substantially linear polyarylsulfones having terminal units of the formula:

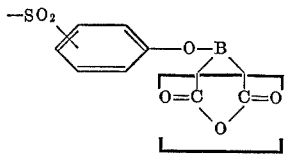

wherein B is an aromatic group containing only carbon and hydrogen and having from about 6 to 13 carbon atoms and $n$ is 1–2, the polymers being soluble in concentrations up to 10 percent in phenol at 175° C. and the molar ratios of the anhydride to the sulfone groups therein ranging from about .005 to 1.

12. A linear polymer according to claim 11 wherein $n$ is 1.

13. A linear polymer according to claim 12 wherein B is a benzene ring.

14. Thermoplastic, substantially linear polyarylsulfones having terminal units of the formula

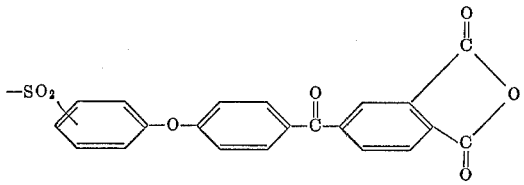

the polymers being soluble in concentrations up to 10 percent in phenol at 175° C. and the molar ratios of the anhydride to the sulfone groups therein ranging from about .005 to 1.

References Cited

FOREIGN PATENTS 1,383,048  11/1964  France.
  639,634  5/1964  Belgium.

WILLIAM H. SHORT, *Primary Examiner.*

M. GOLDSTEIN, *Assistant Examiner.*

U.S. Cl. X.R.

161—193; 260—30.2, 30.8, 32.6, 33.8, 37, 78.4, 79.3, 546